US006978164B2

(12) United States Patent
Vicendese

(10) Patent No.: US 6,978,164 B2
(45) Date of Patent: Dec. 20, 2005

(54) PERSONAL MASSAGING APPARATUS AND METHOD

(76) Inventor: Frank Vicendese, 617 Plainfield Ave., Berkeley Heights, NJ (US) 07922

( * ) Notice: Subject to any disclaimer, the term of this patent is extended or adjusted under 35 U.S.C. 154(b) by 159 days.

(21) Appl. No.: 10/367,551

(22) Filed: Feb. 14, 2003

(65) Prior Publication Data
US 2004/0176037 A1    Sep. 9, 2004

(51) Int. Cl.[7] .............................................. H04B 1/38
(52) U.S. Cl. ................. 455/575.6; 455/90.3; 455/66.1; 455/575.7; 455/575.1; 455/456.2; 455/445; 455/412.2; 455/418; 455/419; 455/420; 379/433.13; 379/433.12; 379/434
(58) Field of Search ..................... 455/66.1, 41.2, 455/418, 419, 412.2, 575.7, 456.2, 426, 90.3, 455/575.3, 575.6; 379/27.01, 433.12, 433.13

(56) References Cited

U.S. PATENT DOCUMENTS

| 5,780,958 | A | * | 7/1998 | Strugach et al. ............ 310/348 |
| 5,848,980 | A | * | 12/1998 | Demerais ..................... 601/46 |
| 6,216,017 | B1 | * | 4/2001 | Lee et al. .................... 455/567 |
| 6,374,089 | B1 | * | 4/2002 | Till ............................ 455/90.1 |
| 6,381,472 | B1 | * | 4/2002 | LaMedica et al. .......... 455/560 |
| 6,650,231 | B1 | * | 11/2003 | Byrne ..................... 340/407.1 |
| 6,681,157 | B2 | * | 1/2004 | Kageyama ..................... 701/1 |
| 6,694,143 | B1 | * | 2/2004 | Beamish et al. ......... 455/456.1 |
| 6,744,370 | B1 | * | 6/2004 | Sleichter et al. ............ 340/576 |

\* cited by examiner

Primary Examiner—Marceau Milord
(74) Attorney, Agent, or Firm—Jeffery J. Brosemer

(57) ABSTRACT

A personal massaging method and apparatus constructed from a wireless cellular telephone, preferably provisioned for extended ring/vibrate, having either an attachable/removable, fixed, or integral stimulator on a surface of the telephone. When the telephone is called, the wearer or user receives a desirable level of stimulation when the stimulators are applied to a sensitive portion of the user's body. A variety of shapes, sizes and materials may be used for the stimulators to provide a wide array of stimulation or massage.

17 Claims, 7 Drawing Sheets

300  301

300  301

300  301

PERSONAL MASSAGING APPARATUS AND METHOD

BACKGROUND OF THE INVENTION

1. Field of the Invention

This invention relates generally to the field of personal massaging devices and in particular to a method and apparatus for personal massaging incorporating wireless, cellular telephones.

2. Description of the Prior Art

Personal massaging devices have been developed in a variety of shapes and sizes and power sources such that they may effectively and conveniently provide stimulation and/or massage to nearly every part of the human body. In particular, personal massagers have been developed which are corded, employing generally 120VAC power sources; cordless, employing compact battery power sources; and some, that are even capable of being remotely controlled.

Despite these developments however, there exists a continuing need for personal massaging devices that offer increased convenience and effectiveness. the service provider preferably provisions the cellular service for an "extended ring", such that many more, for example, 9, ring cycles are initiated before such automatic call pick up. In this inventive manner, a prolonged period of stimulation is provided and in those uses where sexual stimulation is provided, the user may achieve climax.

While different cellular service providers provide varying degrees of extended ring, the provisioning is relatively straightforward for the service provider and may be initiated by the user either at service order time or later.

Various additional modifications of this invention will occur to those skilled in the art. Accordingly, all deviations from the specific teachings of this specification that basically rely upon the principles and their equivalents through which the art has been advanced are properly considered within the scope of the invention as described and claimed.

SUMMARY OF THE INVENTION

I have invented a personal massaging method and apparatus that is convenient, compact, battery operated, and controllable remotely via wireless telephonic methods.

Viewed from one aspect, my invention is directed to an apparatus for providing a personal massage to the user or wearer of the apparatus. The personal massaging apparatus is constructed from a wireless cellular telephone, provisioned for extended ringing or vibrating, having either an attachable or integral stimulator affixed to an appropriate surface of the telephone. Advantageously, the stimulators, particularly the attachable ones, may be constructed in a variety of shapes and sizes, made from a variety of materials such that maximum stimulation or massage is provided.

Viewed from another aspect, my invention is directed to a method for providing a personal massage utilizing a wireless cellular telephone. Specifically, my inventive method involves: 1) provisioning the wireless cellular telephone—having integral or attachable stimulators—for an extended ring/vibrate; 2) wearing or otherwise positioning the stimulators such that they contact the portion of the body which is to receive the massage and/or stimulation; and 3) activating the wireless cellular telephone by dialing its telephone number such that the extended ring/vibrate is activated thereby providing the massage and/or stimulation via stimulators.

Viewed from yet another aspect, my invention is directed to stimulator devices, which may be attached to a surface of a cellular telephone such that when the cellular telephone is undergoing a ring/vibrate cycle, particularly an extended ring/vibrate, massage and/or stimulation is provided to the wearer or user of the cellular telephone.

DETAILED DESCRIPTION OF THE INVENTION

Figure 1:
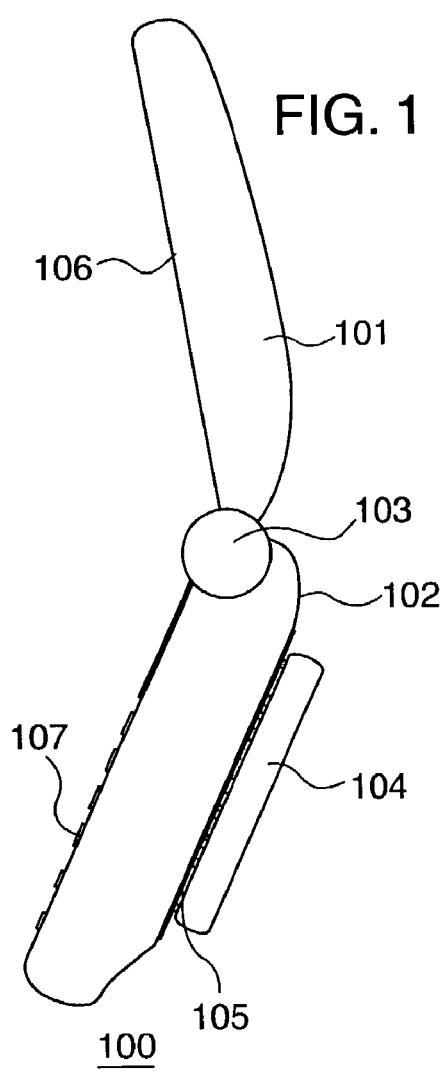
FIG. 1 shows side view of a foldable cellular telephone according to the present invention.

FIG. 1 illustrates the basic concept of my invention. With reference now to that FIG. 1, there is shown side view of a contemporary, foldable cellular telephone 100. Specifically, such a foldable cellular telephone includes upper housing 101 having an integral earpiece/speaker 106, and lower housing 102 having an integral keypad 107. The two housings are shown foldably connected to each other by hinge, 103. Additionally stimulators 104 are attached to one or both of the housings. Not specifically shown in the FIG., but an element generally observable on all cellular telephones is an antenna.

In normal operation, and as can be appreciated by one skilled in the art, the cellular telephone undergoes ring/vibrate cycle(s) whenever the cellular telephone is powered-on and its unique phone number is dialed from another telephone. Typically, a cellular telephone will offer the user the option of whether an audible ring, or a perceptible vibration is used to notify the user of an incoming call. It is beyond the scope of the present invention to state particularly how an individual cellular telephone offers such ring/vibrate choices, however such ring/vibrate mode(s) are normally selected by the user via keypad 107.

As noted above, when the unique telephone number of the cellular telephone 100 is dialed from another telephone which could be located anywhere in the world, the public switched telephone network, through mechanisms generally known to those skilled, locates the specific cellular telephone 100 within the public telephone network and causes it to ring/vibrate such that the user of the cellular telephone is made aware of an incoming call. In a normal telephone call, the user answers the phone by opening the phone, or pressing a button on the keypad 107 to accept the call. After the call is completed, the user generally disengages the call by pressing, for example, an "END" key on the keypad 107 or another key that terminates the call.

As is now taught by the present invention, stimulators 104, which are shown attached to housing 102, when held or otherwise positioned against the user's body during a ring/vibrate cycle, provide desirable or otherwise beneficial massaging or stimulation to the user. Of particular utility, the relatively high frequency with which contemporary cellular telephones vibrate provides a particularly stimulating massage to the user. As should be apparent, the user of the massaging cellular telephone may place or otherwise affix the massaging cellular telephone to virtually any part of the body. Conveniently, it may be affixed to an article of clothing. Accordingly, its utility for providing stimulation, to nearly every part of the male or female anatomy, is widespread.

Although in FIG. 1 the stimulators 104 are shown attached to the lower housing, it should be readily apparent and well within the scope of the present invention to include stimulators on one or both housings. Importantly, the stimulators may be user attachable/detachable by permanent or non-permanent means 105, or made integral to the housing itself.

In particular, the stimulators may be permanently affixed to the housing with any of a variety of adhesives or adhesive methods known generally in the art. Alternatively, the stimulators may be non-permanently attached using known non-permanent methods such as hook-and-loop fasteners, i.e., VELCRO, or other methods. In this manner, and as can be readily appreciated, most any contemporary cellular telephone may be retrofitted to function as the stimulating massager as is taught by the present invention. Equally important, different shapes and or material composition of particular stimulators may be substituted according to user preference, through the use of the non-permanent attachment(s).

Figure 2:
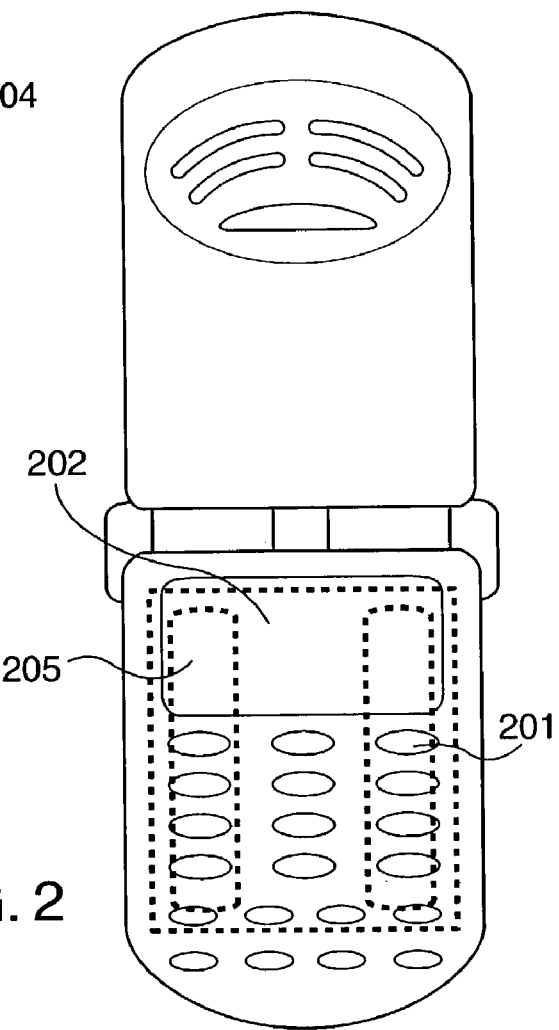
FIG. 2 shows a front view of a foldable cellular telephone according to the present invention.

With reference now to FIG. 2, there is shown a front view of the foldable cellular telephone of FIG. 1. Specifically, keypad 201 and display 202 are quickly recognized. Not specifically shown in the FIG. 2 view, are stimulators 205, which are attached to a rear housing of the telephone and designated by dotted lines. Accordingly, one can quickly realize and appreciate that my inventive method and apparatus is not particularly cumbersome, and as such does not generally preclude the normal telephonic use of the cellular telephone.

Figure 3A:
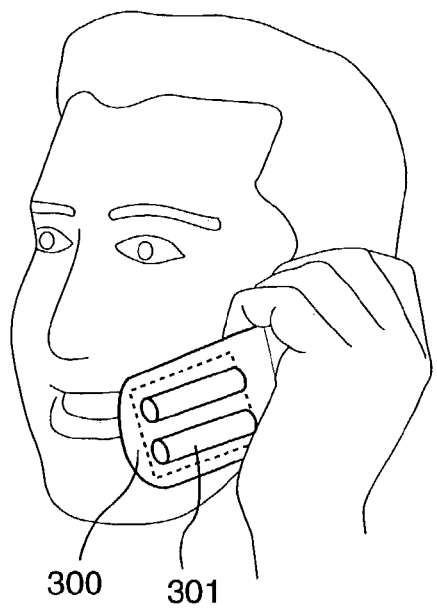
FIG. 3(a–c) shows the cellular telephone of FIG. 1 and FIG. 2 in operation as a cellular telephone according to the present invention.
Figure 3B:
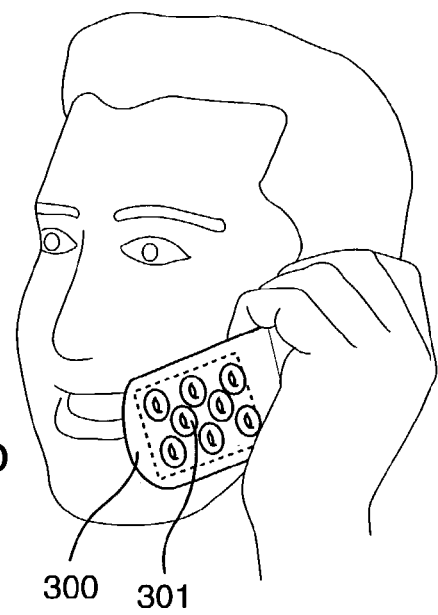
Figure 3C:
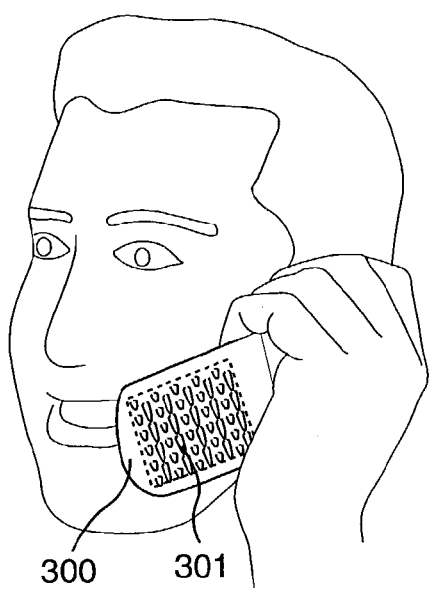

Turning our attention now to FIG. 3, there is shown in FIG. 3(a–c) the cellular telephone of FIG. 1 and FIG. 2, as it would typically be used as a cellular telephone. From the FIG. 3(a–c), it should be apparent that even with stimulators 301 attached to the telephone 300, my inventive method and apparatus does not inhibit its use as a cellular telephone.

Figure 4A:
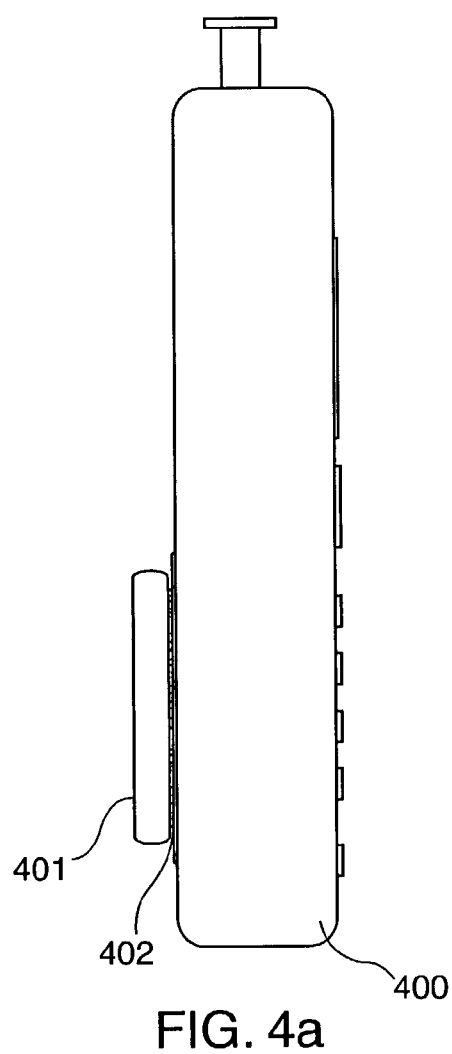
FIG. 4(a) shows a side view of a non-foldable cellular telephone according to the present invention.
Figure 4B:
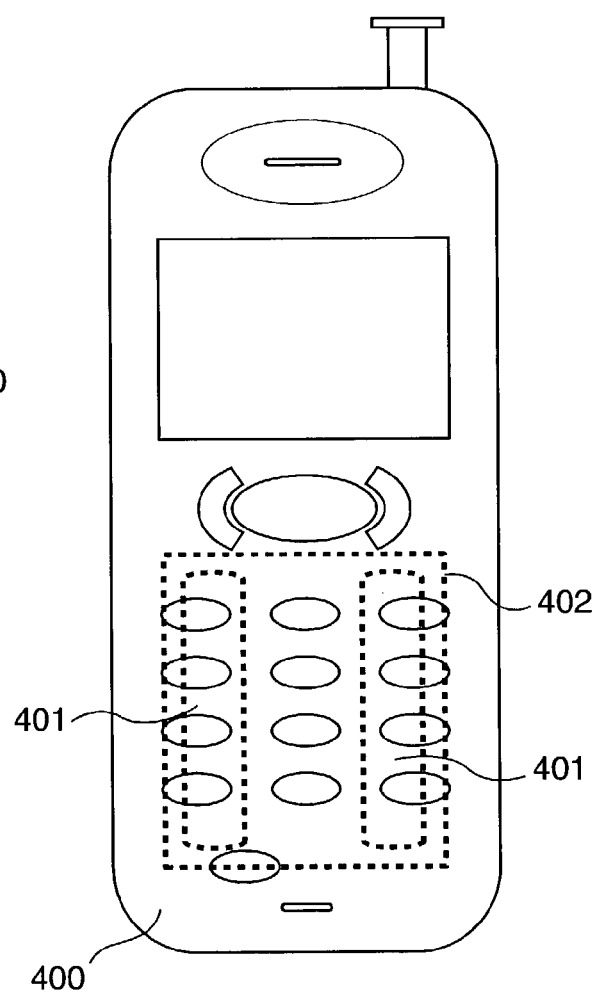
FIG. 4(b) shows a front view of a non-foldable cellular telephone according to the present invention.

FIG. 4 shows a side view of a contemporary, non-foldable cellular telephone 400 with stimulators 401 attached by non-permanent fastener 402 to a rear surface of the telephone. As can now be quickly appreciated, the inventive massager of the present application is flexible enough to be used with most any, compact cellular telephone. Importantly, and as will be discussed later, the invention should not be viewed so restrictively as to limit it to cellular telephones. In particular, any device that is responsive to public switched telephonic switching signals and produces sufficient vibrations in response to a specific ring down signal from that network, could suffice as a personal stimulator according to my inventive teachings. In this manner, such a device would only be useful for telephonic initiated stimulation and not for telephony, as it is assumed in this scenario that the vibrating device does not support telephonic communication.

With this in mind, it is well within the scope of the present invention to include devices such as personal pagers, where they are capable of supporting extended vibrate cycles. Accordingly, my inventive stimulators could be either permanently or non-permanently applied, or made integral to the casing, of personal paging devices which, like the cellular telephones described above, would be retrofitted to act as stimulators. Advantageously, such devices would not necessarily operate as "cellular" devices, but could be initiated by other methods known in the art such as paging methods.

Figure 5:
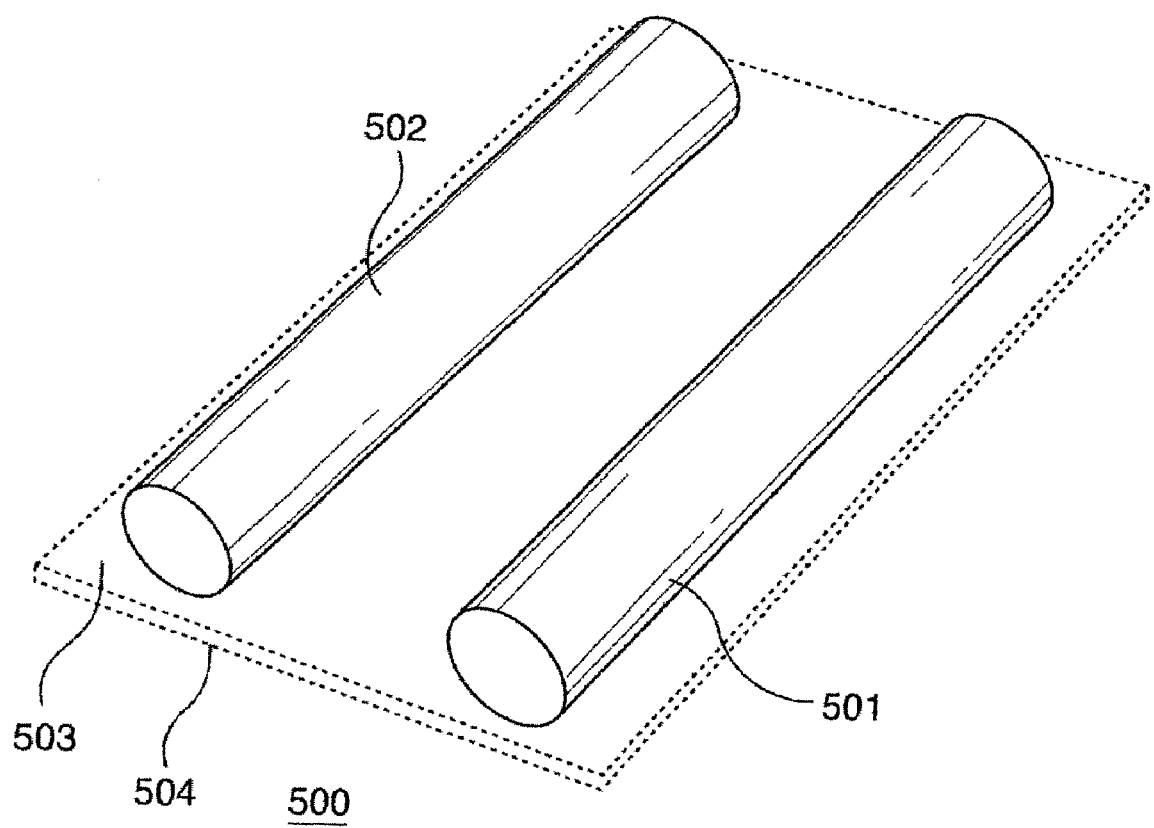
FIG. 5 shows a representative stimulator according to the present invention.

Turning our attention now to FIG. 5, there is shown a stimulator 500, including individual stimulator elements 501, 502 affixed to non-permanent fastener having a hook layer 503 and a loop layer 504. As can be appreciated, one of the individual hook/loop layer(s) is affixed to a surface of a cellular telephone or other device as contemplated above, such that the stimulator 500 can be affixed or removed conveniently. Additionally, the hook and loop type fastener may be made from any suitable, known material(s).

In this specific implementation shown in FIG. 5, the stimulator elements 501, 502 are generally cylindrical in shape, spaced apart to provide appropriate stimulation to a body part as appropriate. The stimulator elements may be constructed from any of a variety of materials selected for their stimulative effect, and their compatibility with the user's body part. Advantageously, a number of plastic or rubber (silicone) materials are satisfactory and contemplated within the scope of my invention. In addition, the particular shape and or separation between individual stimulator elements may be varied to provide desired stimulation to virtually any part of the human anatomy.

Figure 6A:
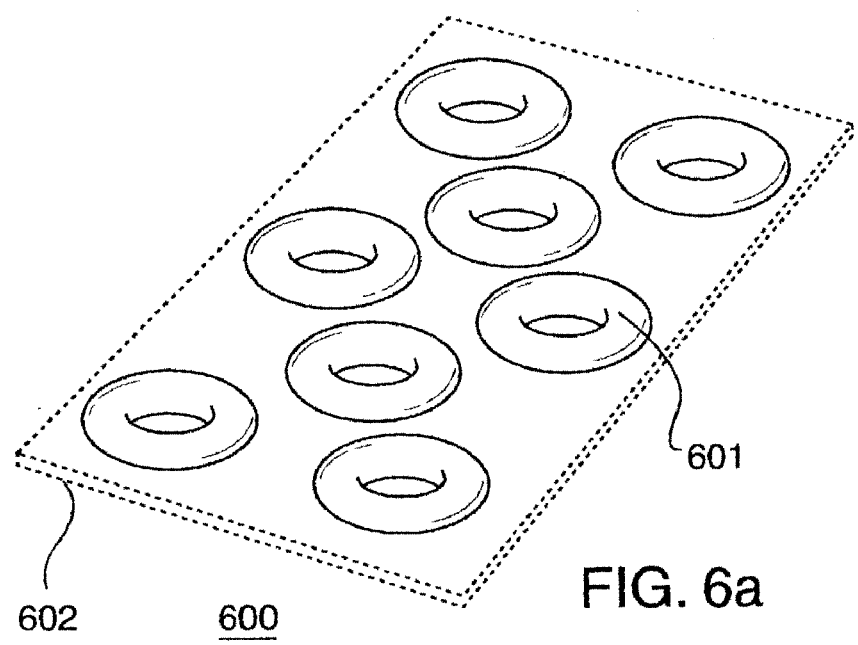
FIG. 6(a–d) show representative stimulator elements according to the present invention.

With reference now to FIG. 6(a), there is shown a stimulator 600, having alternatively shaped stimulator elements 601 affixed to attachment mechanism 602. Specifically, the stimulator elements in this FIG. 6 are shown as "doughnuts". It should be readily apparent that any number of a variety of shapes of stimulator elements are possible and contemplated. Specifically, there is shown in FIG. 6 a number of doughnut shaped stimulator elements 601, but any number of one or more may be used depending upon the level of stimulation desired. Similarly, the attachment mechanism 602 may be hook and loop as described prior or alternative.

Figure 6B:
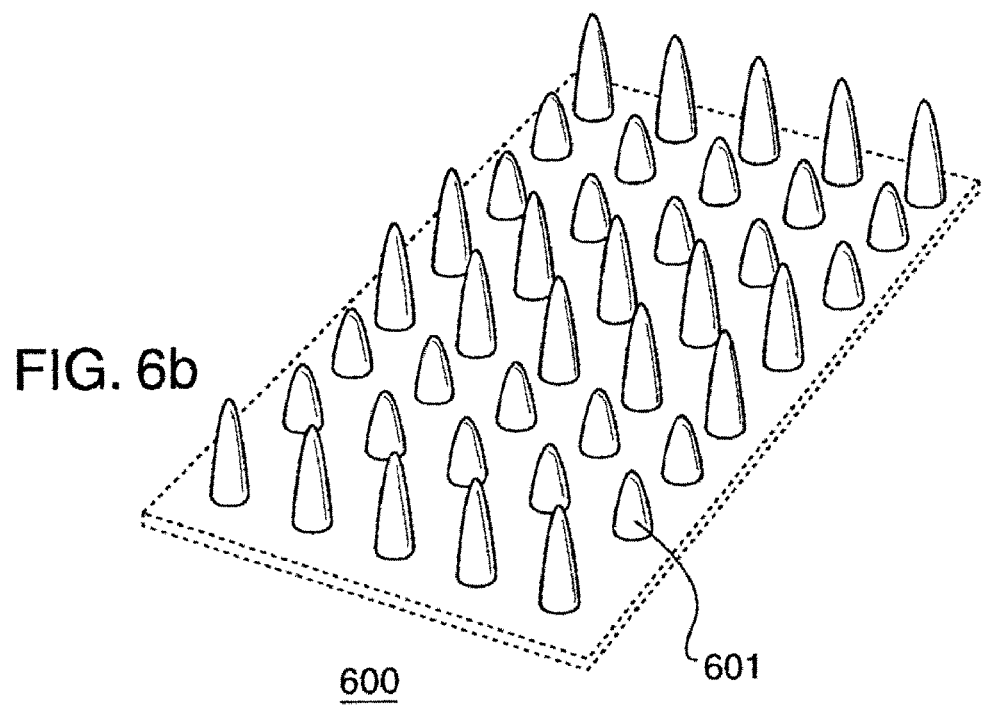
Figure 6C:
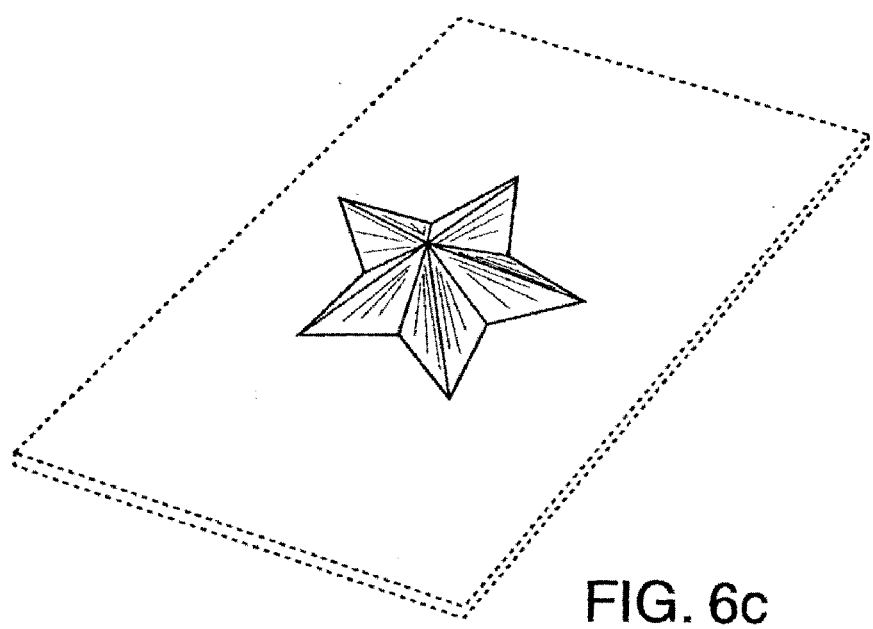
Figure 6D:
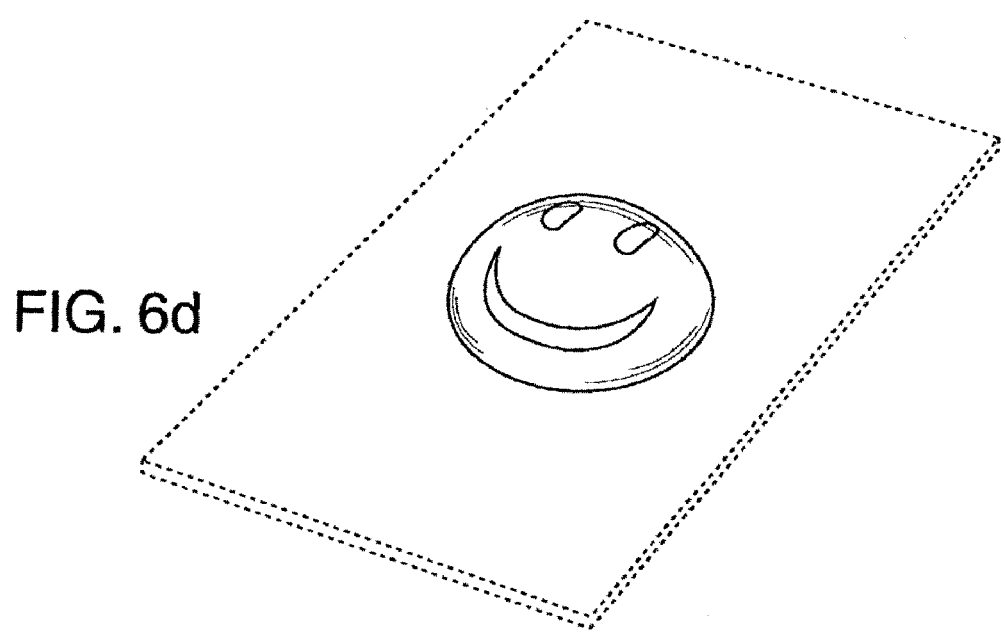

Turning our attention now to FIG. 6(b), there is shown stimulator 600 having "nub" shaped stimulator elements 601. At this point, it should be readily apparent that almost any shape of stimulator/stimulator element(s) are possible—depending upon what level of stimulation and/or massage is desired. More specifically, "star" shapes such as that shown in FIG. 6(c), short "nubs", or longer "grass like" stimulator elements (as are shown in FIG. 6(b)), are all contemplated and are capable of providing satisfactory stimulation depending upon whether the user is male or female, and what specific body part the user is applying the stimulation to. It is contemplated that even novelty styles of stimulator, such as that shown in FIG. 6(d), are within the scope of my invention and would provide satisfactory stimulation in the appropriate circumstance.

Figure 7:
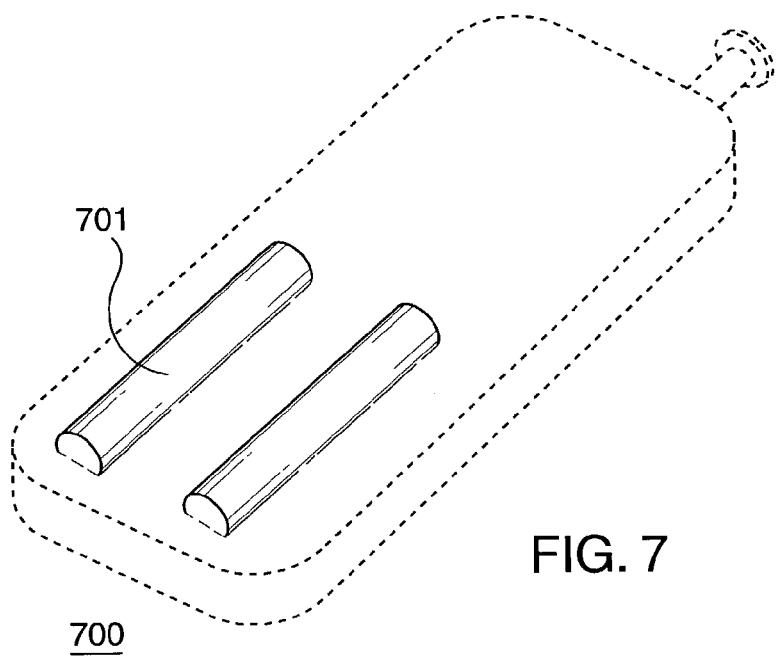
FIG. 7 shows a representative cellular telephone with integral, non-removal stimulators according to the present invention.

To this point I have discussed my invention in the context of removable stimulators. As noted above, and as depicted in FIG. 7, one or both of the housings of the cellular telephone may be shaped sufficiently to provide stimulation such that the removable stimulator assembly described above is not required. With specific reference now to that FIG. 7, massager 700 is shown having integral, stimulators 701 wherein a case or housing of the massager is shaped to particularly provide stimulation. Of course, and as can be readily appreciated by those skilled in the art, any of a variety of shapes, and or materials are contemplated as above. It should also be apparent, particularly with the type and style of my inventive massager shown in FIG. 7, that a personal pager is suited for this implementation, particularly when such a device is capable of supporting the type of ring/vibrate contemplated by my invention and which provides suitable stimulation.

Figure 8:
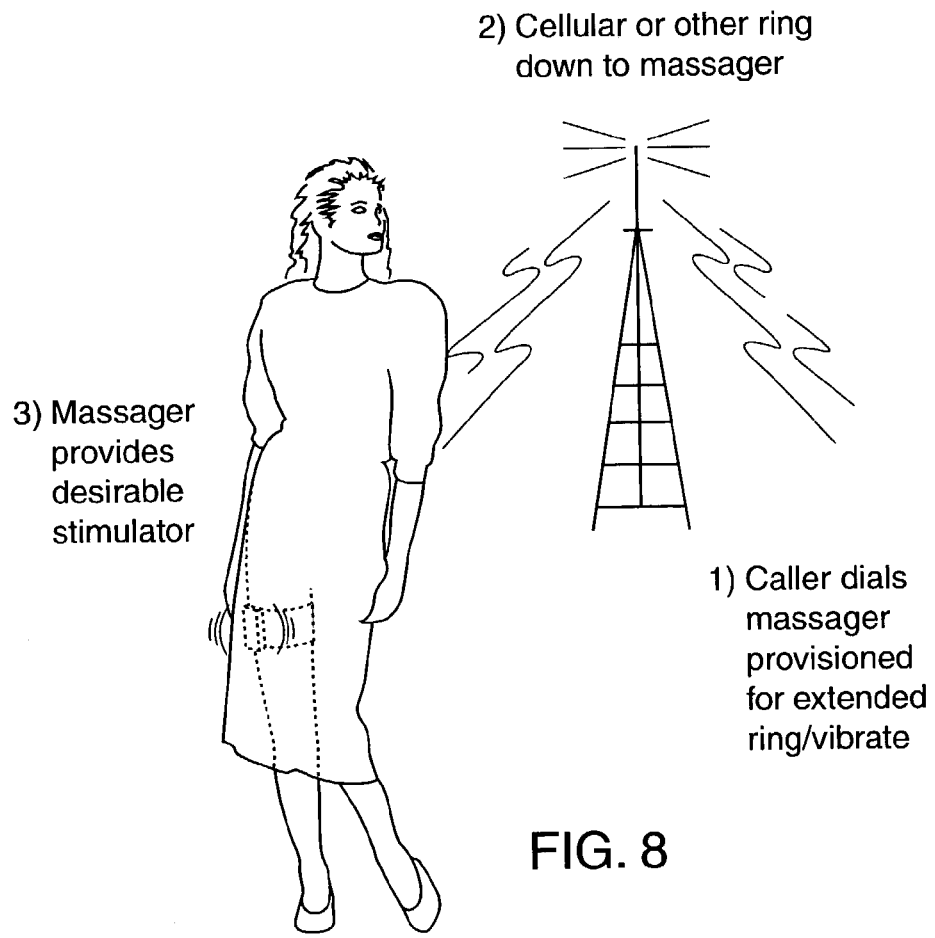
FIG. 8 shows a representative cellular telephone massager worn by a user.

With final reference now to FIG. 8, there is shown a user of my inventive personal massager 800, with it worn on an appendage. While this example shows my invention worn in such a manner as to provide muscular stimulation or massage, it is of course contemplated and anticipated that my inventive method and apparatus is quite suitable for other, i.e., sexual stimulation or massage as well. Specifically, and not by way of limitation, a user of my invention could position it and its stimulators on any sensitive portion of the user's body, for example, his/her genital area. Such use provides quite stimulating sexual massage and stimulation to the wearer. With appropriately designed stimulator elements, internal stimulation is possible and quite satisfying for the user.

Lastly, and as shown in FIG. 8, it is a preferred embodiment of my invention to provision, or have provisioned, an extended ring or vibrate to the cellular telephone. More particularly, and as can be appreciated by those skilled in the cellular arts, service providers typically provide limited ringing to conserve scarce network resources. Specifically, cellular service providers typically provision a cellular telephone service such that a limited number of rings (for example 3, or 4) are the maximum number of rings or vibrate cycles before routing a call to a voice mailbox or other automatic pick up. With my invention, the service provider preferably provisions the cellular service for an "extended ring", such that many more, for example, 9, ring cycles are initiated before such automatic call pick up. In this inventive manner, a prolonged period of stimulation is provided and in those uses where sexual stimulation is provided, the user may achieve climax.

While different cellular service providers provide varying degrees of extended ring, the provisioning is relatively straightforward for the service provider and may be initiated by the user either at service order time or later.

Various additional modifications of this invention will occur to those skilled in the art. Accordingly, all deviations from the specific teachings of this specification that basically rely upon the principles and their equivalents through which the art has been advanced are properly considered within the scope of the invention as described and claimed.

I claim:

1. A personal massager comprising:
    a cellular telephone having one or more stimulators, non-electrically affixed to the telephone;
    wherein said cellular telephone is interoperable with a service provider's cellular network, said service providers network being provisioned to provide an extended ring/vibrate to said cellular telephone;
    such that when the cellular telephone is called and held against a portion of a user's body, the vibrating cellular telephone mechanically vibrates the stimulators and the vibrating stimulators produce a desirable level of massage and/or stimulation to the user.

2. The personal massager according to claim 1 wherein the stimulators are remove ably affixed to the telephone by a hook-and-loop fastener.

3. The personal massager according to claim 1 wherein the stimulators are made integral to a housing of the cellular telephone.

4. The personal massager according to claim 1 wherein the stimulators are generally cylindrical in shape.

5. The personal massager according to claim 1 wherein the stimulators are generally nub shaped.

6. The personal massager according to claim 1 wherein the stimulators include novelty shapes.

7. A personal massaging method comprising the steps of:
    contacting stimulators, non-electrically affixed to a cellular telephone, to a portion of a users body wherein said cellular telephone is interoperable with a service provider's cellular network, said service providers network being provisioned to provide an extended ring/vibrate to said cellular telephone; and
    telephoning the cellular telephone such that when the cellular telephone rings/vibrates, the vibrating cellular telephone mechanically causes the stimulators to vibrate and a desirable level of massage and/or stimulation is produced in the user.

8. The method according to claim 7 wherein the stimulators are remove ably affixed to the telephone by a hook-and-loop fastener.

9. The method according to claim 7 wherein the stimulators are made integral to a housing of the cellular telephone.

10. The method according to claim 7 wherein the stimulators are generally cylindrical in shape.

11. The method according to claim 7 wherein the stimulators are generally nub shaped.

12. The method according to claim 7 wherein the stimulators include novelty shapes.

13. A stimulator for affixing to a cellular telephone, said stimulator comprising:
    one or more stimulator elements; and
    means for non-electrically affixing the stimulator elements to the cellular telephone wherein said cellular telephone is interoperable with a service provider's cellular network, said service providers network being provisioned to provide an extended ring/vibrate to said cellular telephone;
    such that when the cellular telephone is called, the vibrating cellular telephone mechanically induces the stimulators to vibrate sufficiently to produce a desirable level of massage and/or stimulation for a user when the vibrating stimulator is held against a portion of the users body.

14. The stimulator according to claim 13 wherein the affixing means includes a hook-and-loop fastener.

15. The stimulator according to claim 14 wherein the stimulator elements include novelty shapes.

16. The stimulator according to claim 13 wherein the stimulator elements are generally cylindrical in shape.

17. The stimulator according to claim 13 wherein the stimulator elements are generally nub shaped.

* * * * *